United States Patent
Gold et al.

(10) Patent No.: US 6,625,676 B1
(45) Date of Patent: Sep. 23, 2003

(54) SMALL COMPUTER SYSTEM WITH INTERFACE CONTROL AND METHOD OF OPERATING SAME

(75) Inventors: Stephen Gold, Bristol (GB); Jon Bathie, Bristol (GB)

(73) Assignee: Hewlett-Packard Development Company, L.C., Houston, TX (US)

( * ) Notice: Subject to any disclaimer, the term of this patent is extended or adjusted under 35 U.S.C. 154(b) by 257 days.

(21) Appl. No.: 09/640,181

(22) Filed: Aug. 17, 2000

(30) Foreign Application Priority Data

Aug. 17, 1999 (EP) .............................. 99306464

(51) Int. Cl.[7] .......................... G06F 13/14; G06F 13/10
(52) U.S. Cl. ........................................ 710/74; 709/326
(58) Field of Search ............... 710/62–74; 709/321–327

(56) References Cited

U.S. PATENT DOCUMENTS

| 5,073,854 A | | 12/1991 | Martin et al. | |
| 5,867,736 A | * | 2/1999 | Jantz | 710/74 |
| 5,895,493 A | * | 4/1999 | Gatica | 711/147 |
| 5,975,738 A | * | 11/1999 | DeKoning et al. | 700/79 |
| 6,182,198 B1 | * | 1/2001 | Hubis et al. | 711/162 |
| 6,356,979 B1 | * | 3/2002 | Sicola et al. | 711/114 |

FOREIGN PATENT DOCUMENTS

EP 0 798 629 A 10/1997

* cited by examiner

Primary Examiner—Sumati Lefkowitz

(57) ABSTRACT

Diagnostic data in a sequential access Small Computer System Interface device is accessed by a first logical unit. A second logical unit is configurable to control a mode of operation of the first logical unit. The first unit Provides normal and/or backup functions while the second unit provides diagnostic/status functions or the second unit activates the first unit to be online or offline, depending on the first unit being commanded to perform the diagnostic function.

12 Claims, 10 Drawing Sheets

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Peripheral qualifier (0) | | | Device type code (01) | | | | |
| 1 | RMB (1) | Device type modifier (0) | | | | | | |
| 2 | ISO version (1) | | ECMA version (0) | | | ANSI approved version (2) | | |
| 3 | AENC (0) | TrmIOP (0) | Reserved | | Response data format (2) | | | |
| 4 | Additonal data length (117) | | | | | | | |
| 5 | Reserved | | | | | | | |
| 6 | Reserved | | | | | | | |
| 7 | RelAdr (0) | WBus32 (0) | WBus16 (0) | Sync (0) | Linked (0) | Reserved | CmdQue (0) | SftRe (0) |
| 8-15 | Vendor identification string ("HP") | | | | | | | |
| 16-31 | Product identification string ("C5683A") | | | | | | | |
| 32-35 | Product revision level string | | | | | | | |
| 36-55 | Vendor-specific information string | | | | | | | |
| 56-95 | Reserved | | | | | | | |
| 96-end | Vendor-specific data | | | | | | | |

Fig. 8

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Peripheral qualifier (0) | | | Device type code (09) | | | | |
| 1 | RMB (0) | Device type modifier (0) | | | | | | |
| 2 | ISO version (1) | | ECMA version (0) | | | ANSI approved version (2) | | |
| 3 | AENC (0) | TrmIOP (0) | Reserved | | Response data format (2) | | | |
| 4 | Additonal data length (117) | | | | | | | |
| 5 | Reserved | | | | | | | |
| 6 | Reserved | | | | | | | |
| 7 | RelAdr (0) | WBus32 (0) | WBus16 (0) | Sync (0) | Linked (0) | Reserved | CmdQue (0) | SftRe (0) |
| 8-15 | Vendor identification string ("HP") | | | | | | | |
| 16-31 | Product identification string ("HP Diagnostic") | | | | | | | |
| 32-35 | Product revision level string | | | | | | | |
| 36-55 | Vendor-specific information string | | | | | | | |
| 56-95 | Reserved | | | | | | | |
| 96-end | Vendor-specific data | | | | | | | |

Fig. 9

SMALL COMPUTER SYSTEM WITH INTERFACE CONTROL AND METHOD OF OPERATING SAME

FIELD OF THE INVENTION

The present invention relates to a device configurable to exchange data with a digital computer across a Small Computer System Interface (SCSI) bus.

BACKGROUND TO THE INVENTION

It is known to connect digital computers to peripheral devices which may be physically distinct from the digital computer or contained within a same casing as a motherboard of the digital computer. Such peripheral devices typically include direct-access storage devices such as disk drives from which data stored on the disk drives may be recovered in any order. Additionally peripheral devices include sequential access storage devices, typically magnetic tape data storage devices, in which data must be recovered sequentially.

Referring to FIG. 1 herein there is illustrated a conventional digital computer 100 having access to a data storage device 120. The digital computer 100 and data storage device 120 are typically configured to exchange data across a cable connection 110. A conventional means for interfacing a computing entity such as a digital computer with a peripheral device such as a disk drive or magnetic tape data storage device is described by the Small Computer System Interface (SCSI). By way of example, referring to FIG. 1 herein digital computer 100 is configured to exchange data with a SCSI compatible device 120 across a small computer system interface bus carried across cable connection 110.

Referring to FIG. 2 herein, there is illustrated schematically a first example of a conventional small computer system interface configuration. By way of example, digital computer 200 is configured to exchange digital data with a plurality of peripheral devices 204, 205. Peripheral devices 204, 205 may be disk drives, printers, optical-disks, magnetic tape data storage devices or the like, which are SCSI compatible. Processors operating within digital computer 200 requiring to initiate a transfer of data to peripheral devices 204, 205 transfer data across SCSI bus 202 via a host bus adapter 201 and a controller 203.

Referring to FIG. 3 herein, there is illustrated another conventional SCSI configuration comprising a single initiating device such as a digital computer 300 sending and receiving data to and from multiple target devices 301, 302, 303 and 304 across a SCSI bus 305 via controllers 306 and 307.

Referring to FIG. 4 herein there is illustrated schematically, in more detail, the conventional SCSI configuration illustrated in FIG. 2 herein, the SCSI configuration comprising a single initiating device and a single target device. Digital computer 200 includes a memory means which may be logically sub-divided into a user memory area and a memory area 400 allocated to an operating system kernel (OS/kernel). Conventionally, it is known to generate application software which is configurable to exchange data with a peripheral device 401. Application software 402 may be a computer program for performing back-up operations. Associated with application software 402 is a corresponding respective driver program 403 which is configurable to act as an interface between application software 402 and a SCSI host bus adapter driver program 404. Each application program operating within the memory means of digital computer 200 has a corresponding respective driver program configurable to interface each application program with SCSI host bus adapter card. 405. The host bus adapter card 405 is physically connected to peripheral device 401 via SCSI bus 202. Contained within a memory means of peripheral device 401 is a logical unit 406 configurable to exchange data and commands originated from application program 402 with a SCSI commands block 407.

In conventional SCSI technology, and as described herein, a logical unit is a logical representation of a device such as peripheral device 401. A logical unit is identified by an integer number which is also known herein as a Logical Unit Number (LUN). Each target device logically connected to a SCSI bus has one or more logical units associated with it. A physical device may have up to eight logical units associated with it, each logical unit having a unique identifying integer in the range 0 . . . 7. Each physical device 402 connecting to a SCSI bus has a unique identifier. Hence, each logical unit within a physical device 402 is also uniquely addressable by, for example, application program 402 resident within the OS/kernel of digital computer 200 by specifying the unique identifier of the device, and the logical unit identifying integer within the physical device.

Referring to FIG. 5 herein, there is illustrated schematically a SCSI configuration comprising a plurality of user applications resident within an OS/kernel 400 of digital computer 200. In addition to a data back-up program 402 it is known to configure an application program 500 within the OS/kernel having a corresponding respective driver program 501 which is also configurable to exchange data with device 401 across the SCSI bus 202. Application program 500 may be configured to, for example, check the status of device 401. However, if the device 401 is a serial device such as a magnetic tape data storage device then if more than one application program attempts to send commands to the serial tape device 401 then clashes can occur at the software or physical SCSI level affecting an operation of the serial tape device 401.

It is Important to be able to interrogate serial devices in a "transparent" fashion, that is to say, to obtain data, for example, data concerning the performance of the serial device, without affecting its performance.

SUMMARY OF THE INVENTION

Specific embodiments and methods according to the present invention aim to provide a means for interrogating serial small computer system interface devices in a manner which leaves their normal mode of operation unaffected and thereby enables the performance of such devices to be monitored, without reconfiguration or significant disruption of the basic functionality of those devices.

Additionally, it is a further aim of the present invention to enable modifications to such devices to be accomplished more easily.

According to first aspect of the present invention there is provided a device configurable to exchange data with a digital computer across a small computer system interface bus, said device comprising:

a first logical unit (609); and a second logical unit (610);

characterized in that said second logical unit (610) is configured for receiving a command from said digital computer across said interface bus (608), said command requesting data concerning a status of said device, wherein said receipt of said command requesting said status data is received by said second logical unit substantially independently of an operation of said first logical unit.

According to a second aspect of the present invention there is provided a method for querying a status of a device configurable to exchange data with a digital computer across a small computer system interface bus the method comprising the steps of:

creating a first logical unit within said device;

creating a second logical unit within said device;

characterized by sending a command from said digital computer to said second logical unit across said interface bus requesting status data concerning said device, wherein said step of requesting said status data occurs substantially independently of an operation of said first logical unit.

According to a third aspect of the present invention there is provided a computing entity comprising:

a digital computer device;

a small computer system interface bus, wherein said digital computer device is connected to a first end of said interface bus; and at least one peripheral device connected to a second end of said interface bus;

said computer entity characterized by further comprising:

a first logical unit logically located substantially within said peripheral device;

a second logical unit logically located substantially within said peripheral device, wherein said second logical unit is configurable to control a mode of operation of said first logical unit, for performance of status diagnostic operations of said peripheral device.

According to fourth aspect of the present invention there is provided a method of interrogating a serial small computer system interface compatible device having first and second logical units without affecting a normal mode of operation of said device, said method comprising the steps of:

sending a test signal to said second logical unit of said device;

in response to said test signal, determining a status of said device;

said second logical unit sending a control signal to said first logical unit for sending said first logical unit from an initial on-line condition in which said first logical unit receives commands over said small computer system Interface for said normal mode of operation of said device, to an off-line condition in which said first logical unit communicates diagnostic data over said small computer system interface;

receiving a command signal at said first logical unit said command signal requesting diagnostic data describing parameters of said device;

said first logical unit performing a set of commanded operations in said device for determining said diagnostic data, in response to said received signals;

said first logical unit returning said device to said initial state;

returning said first logical unit to an online condition; and said second logical unit releasing control of said first logical unit once said device is returned to said initial state.

According to a fifth aspect of the present invention, there is provided a method of interrogating a serial small computer system interface compatible device without affecting a normal mode of operation of said device, said method comprising the steps of:

sending a test signal to a first logical unit of said device;

receiving a read command at said device for reading data from said device;

if said read command is rejected by said device, sending a mode command signal to said device to change a mode of operation of said device;

in response to said mode command signal changing a status of said second logical unit to an off-line status; and re-sending said read command to said device.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 8 Illustrates, by way of example, a page of data returned in response to an inquiry command from a logical unit within a sequential access device according to specific methods and embodiments of the present invention;

FIG. 9 is, by way of example, a page of data returned by a diagnostic device in response to an inquiry command according to specific methods and embodiments of the present invention;

DETAILED DESCRIPTION OF THE BEST MODE FOR CARRYING OUT THE INVENTION

There will now be described by way of example the best mode contemplated by the inventors for carrying out the invention. In the following description numerous specific details are set forth In order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific methods according to the present invention as described herein are aimed at digital computers connected to peripheral devices using a standard interface such as the known small computer system Interface. The methods and embodiments disclosed herein are equally applicable to digital computers and peripheral devices connected using any of the revisions of the small computer system interface (SCSI) standard up to and including SCSI-3.

In particular, the methods and embodiments according to the present invention as described herein are aimed at digital computers connected to sequential access devices such as magnetic tape data storage devices across a SCSI bus. As described herein a bus refers to a collection of unbroken signal lines that Interconnect at least one digital computer to at least one peripheral device.

Figure 1:
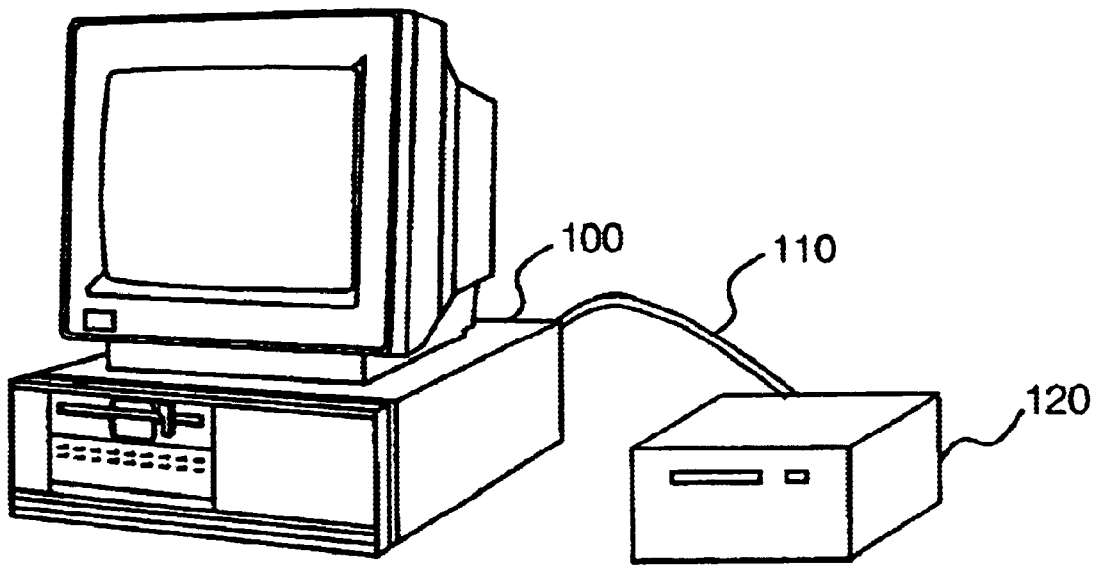
FIG. 1 illustrates schematically a conventional digital computer having access to a data storage device using a conventional small computer system interface.
Figure 2:
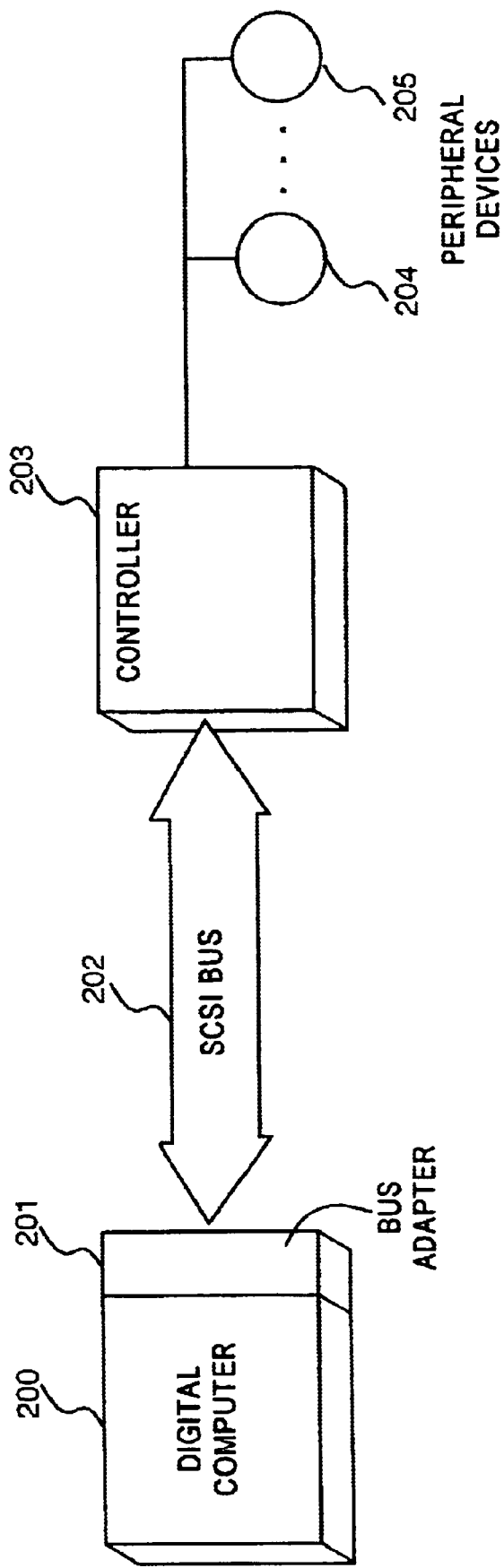
FIG. 2 illustrates schematically a prior art network view of a conventional digital computer connected to a plurality of peripheral devices using a small computer system interface configuration.
Figure 3:
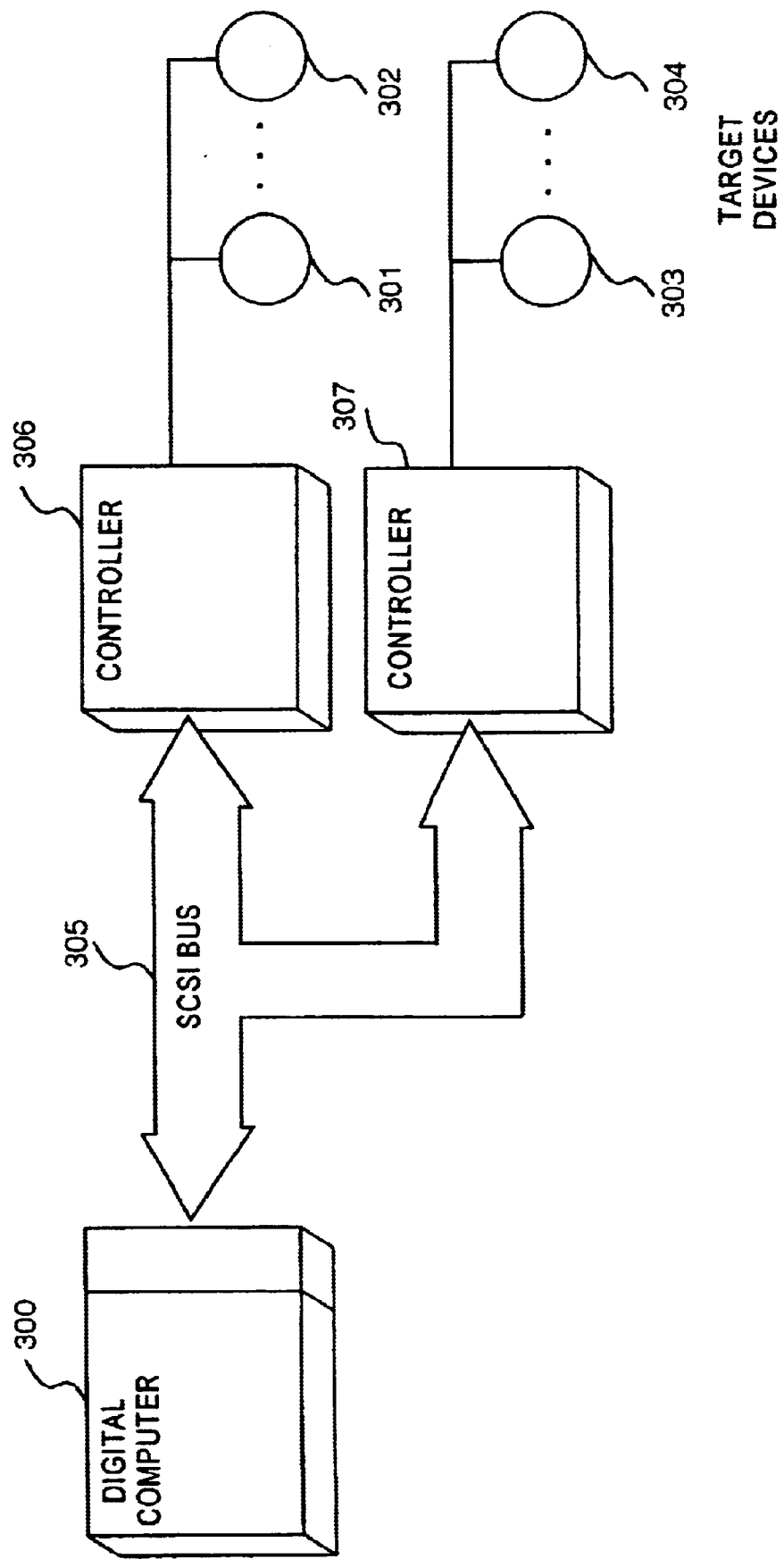
FIG. 3 illustrates schematically a further prior art example of a computer device communicating with a plurality of peripheral devices, via first and second controllers connected by a small computer system interface bus.
Figure 4:
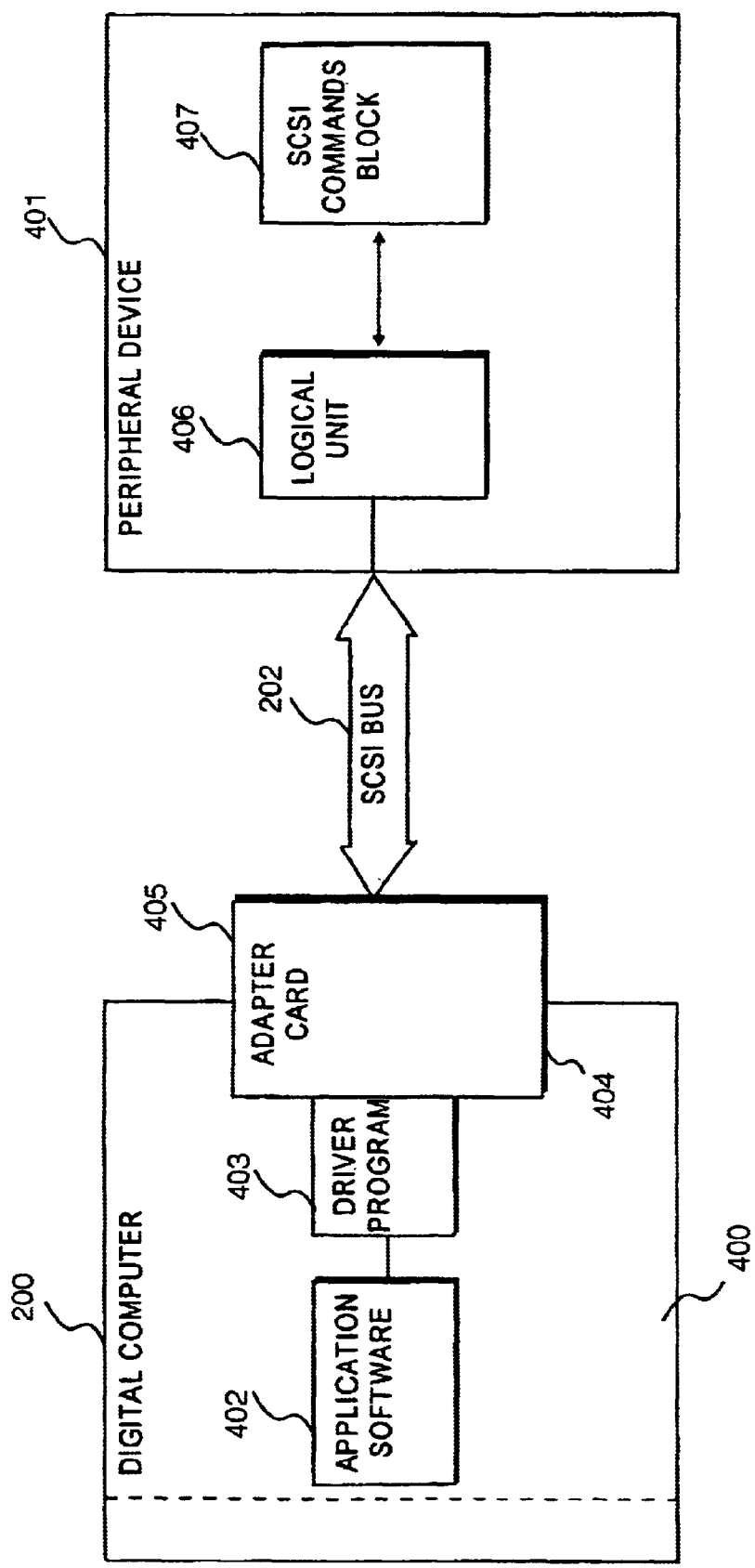
FIG. 4 illustrates schematically elements of a prior art computer connected to a prior art peripheral device using the known small computer system interface.
Figure 5:
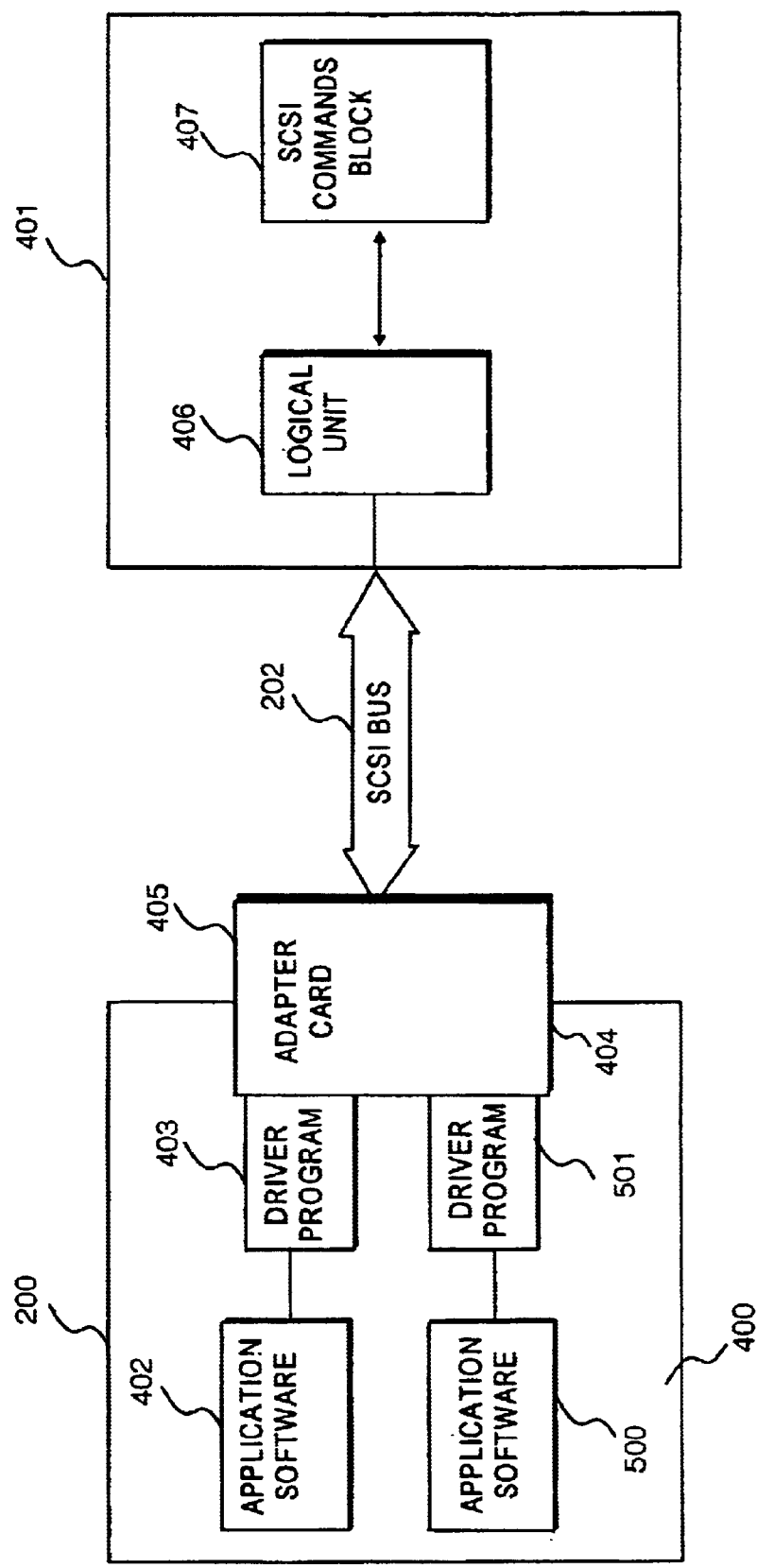
FIG. 5 illustrates schematically a small computer system interface configuration comprising a plurality of user applications resident within an operating system of a digital computer, communicating with a conventional computer peripheral device over a known small computer system interface.
Figure 6:
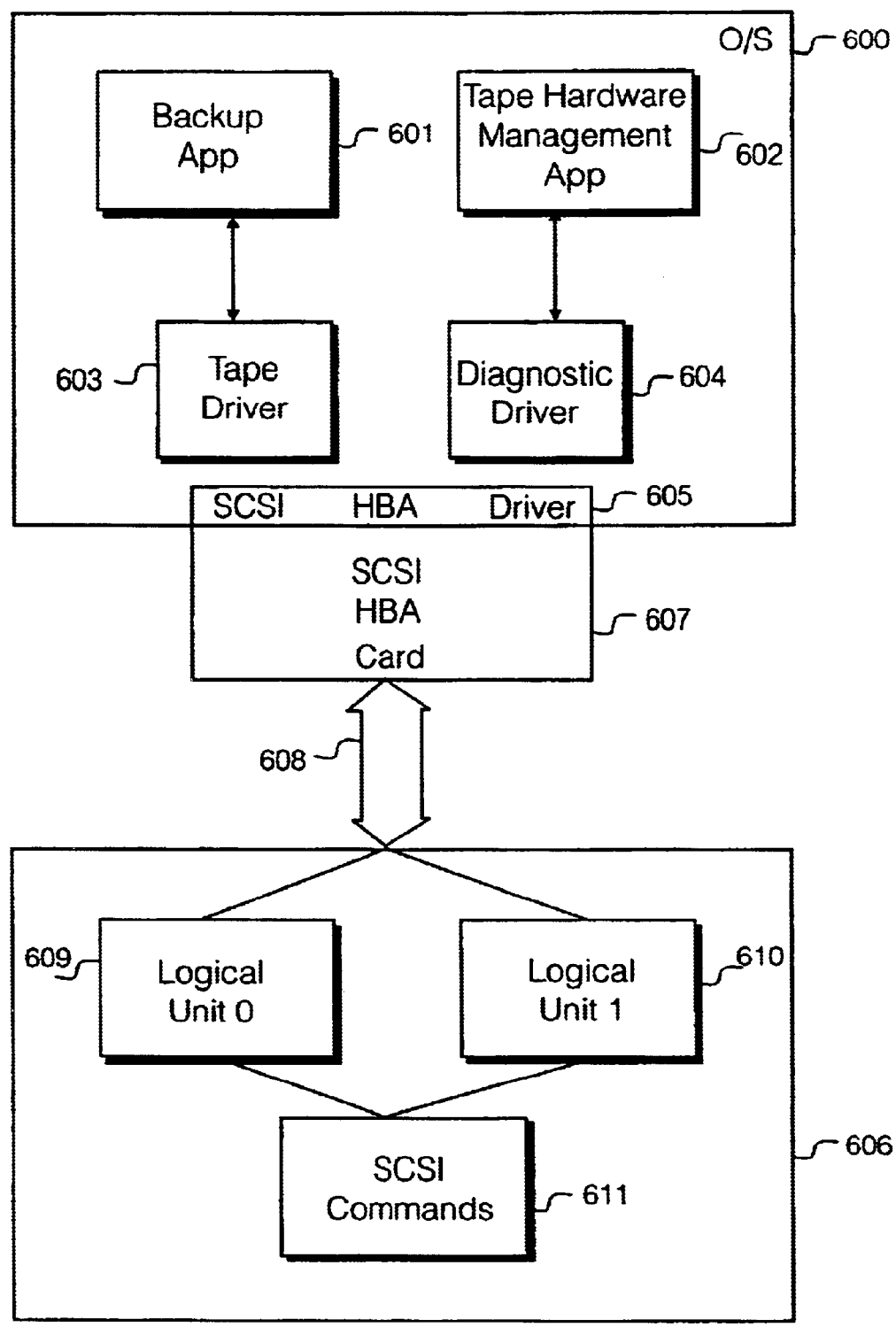
FIG. 6 illustrates schematically a means for transparently interrogating in an Intrusive or non-intrusive manner a serial SCSI device during its normal operation according to specific methods and embodiments of the present invention.

Referring to FIG. 6 herein there is illustrated schematically according to the best mode presented herein a sequential access device accessible from a separate diagnostic program operating within a digital computer. According to the best mode presented herein, logically located within an operating system/kernel 600 of a digital computer there are a plurality of applications 601, 602 resident within the OS, for example a backup application 601 and a tape hardware management application 602. Each user application 603, 604 has a corresponding respective driver program 603, 604 to interface with a SCSI host bus adapter driver 605. First user application 601 may be a conventional data backup application. Each driver program 603 and 604 is a program that runs at the kernel's privilege level and performs input/output operations for each corresponding respective application. Data and commands are exchanged between applications 601 and 602 with a sequential access peripheral device 606 via SCSI host bus adapter (HBA) driver 605, SCSI HBA card 607 and SCSI bus 608.

According to the best mode presented herein, sequential access device 606 is configured to contain two logical units. Preferably these logical units are identified as a first logical unit 0 (609) and a second logical unit 1 (610). Preferably, second logical unit 610 is configured such that it is only accessible to commands originated from tape hardware management application 602. Conversely, first logical unit 609 is configured to only accept commands from back up application 601. In this manner, a tape hardware management application 602 is configurable to interrogate sequential access device 606 whilst that device is in its normal mode of operation. The inclusion of an additional logical unit 611 within device 606 ensures that tape hardware management application 602 can check a status of device 606 whilst sequential access peripheral device 606 is in its normal mode of operation and eliminating the possibility of conflicts with commands originated by back up application 601. Both logical units have access to a stored SCSI command set 611 stored in the sequential access device.

The provision of an extra logical unit 606 and the corresponding tape hardware management application 602 within the OS/kernel of the digital computer may provide the following features:

Whilst the tape drive is in operation it may be possible to obtain configuration information such as details regarding the tape data storage medium, etc;

Status information indicating whether or not the device is busy or Idle. Additionally, the inclusion of a second logical unit accessible by a tape hardware management application will allow errors occurring during a backup operation, for example, to be reported;

Extract diagnostic logs are created which provide a record of measures of the performance of the sequential access device 606 over an extended period of time. Additionally, a history log can be created which is a list of data recording, for example, a total time that the sequential access device has been in use;

Firmware downloads. Typically, the operating system resident within sequential access tape drives is stored in flash memory. Hence, it Is possible to upgrade the sequential access device operating system directly over the SCSI bus;

Non-intrusive diagnostics may be performed whilst the sequential access device 606 is operating. These diagnostics can be performed whilst a normal back up operation is In progress;

The sequential access device 606 may be taken off line in order to allow intrusive diagnostics to be performed. Such intrusive diagnostics could include writing test data and the like to the data storage medium.

Figure 7:
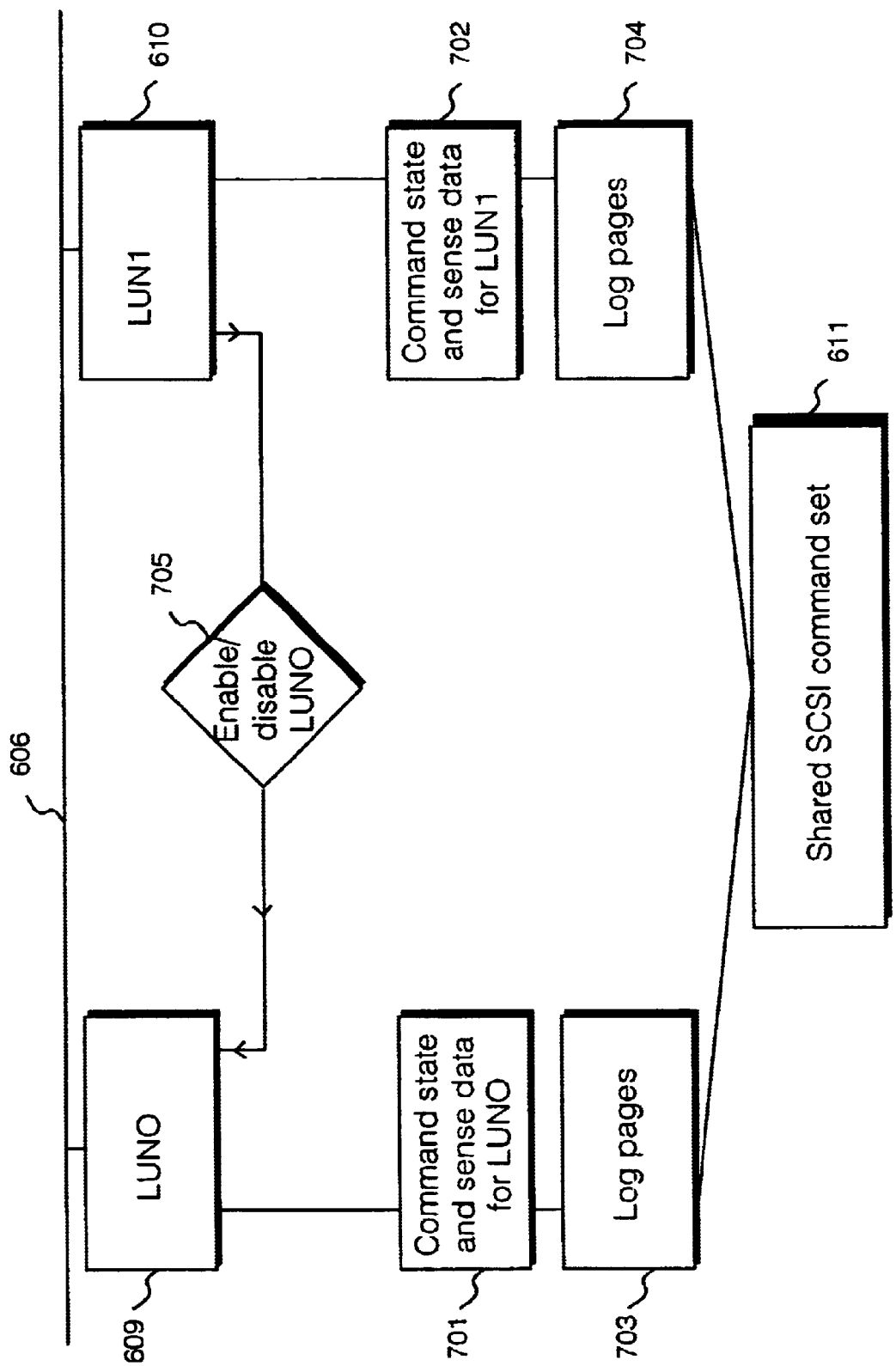
FIG. 7 illustrates schematically, in more detail, the Interconnection of logical units within a serial SCSI device according to specific embodiments of the present Invention.

Referring to FIG. 7 herein, there Is illustrated schematically in further detail a logical arrangement of functional units within the memory means of the sequential access device 606. First logical unit 0 (609) is defined to be a sequential access device type. Second logical unit 1 (610) is preferably defined to be a communications device type. Hence, back up application 601 will only interact with logical units having a device type set to "sequential-access device", whilst logical unit 1 reports as a "communications device" in response to an inquiry command generated by an initiating process within the operating system of the digital computer. Each logical unit has a corresponding respective command state 701, 702 and log pages 703 and 704. Both logical units access a shared SCSI command set 611. Logical unit 1 is configured to control a mode of operation of logical unit 0 by issuing a mode select command. Preferably, log pages 703 and 704 contain a substantially same data. In addition, log pages 703 and 704 are configured such that the data stored in these pages are cleared following a read operation in response to a request sense generated by an initiating device, for example, tape hardware management application 602 located within the operating system of the digital computer. Associated with shared command set 611 are log pages which, in contrast with log pages 703 and 704 are not cleared in response to a request sense command.

Referring to FIG. 8 herein, there is illustrated by way of example, a data field returned by logical unit 0 of sequential access device 606 in response to an inquiry command initiated by, for example, tape hardware management application 602. The sequential access device type code "01" Is located at bit 0 to bit 4 of byte 0 of the returned inquiry data. The inquiry data returned by logical unit 0 further Includes a vendor identification string, for example, "HP" at bytes 8–15 of the inquiry data. Further identification Information is included at bytes 16–31 these bytes being used to represent, for example, a particular type of tape drive such as a "C5683A".

Referring to FIG. 9 herein there is illustrated, in comparison with FIG. 8, an example of inquiry data message returned by the second logical unit 1 according to a specific method of the present invention. Located at bits 0–4 of byte 0 is a device type code "09" representing a communications device. Bytes of the data message 16–31 are used to represent a string Identifying a name of the logical unit configured for providing diagnostic information according to a specific implementation of the present invention.

The inclusion of an additional logical unit within a peripheral device, such as sequential access device 606 where the second logical unit is configured such that it is configurable to issue a command to a first logical unit thereby safely takes the associated tape drive off-line, and enables two particular operations to be performed. The inclusion of second logical unit 1 (610) allows both intrusive and non-intrusive diagnostic operations to be initiated by tape hardware management application 602.

Figure 10:
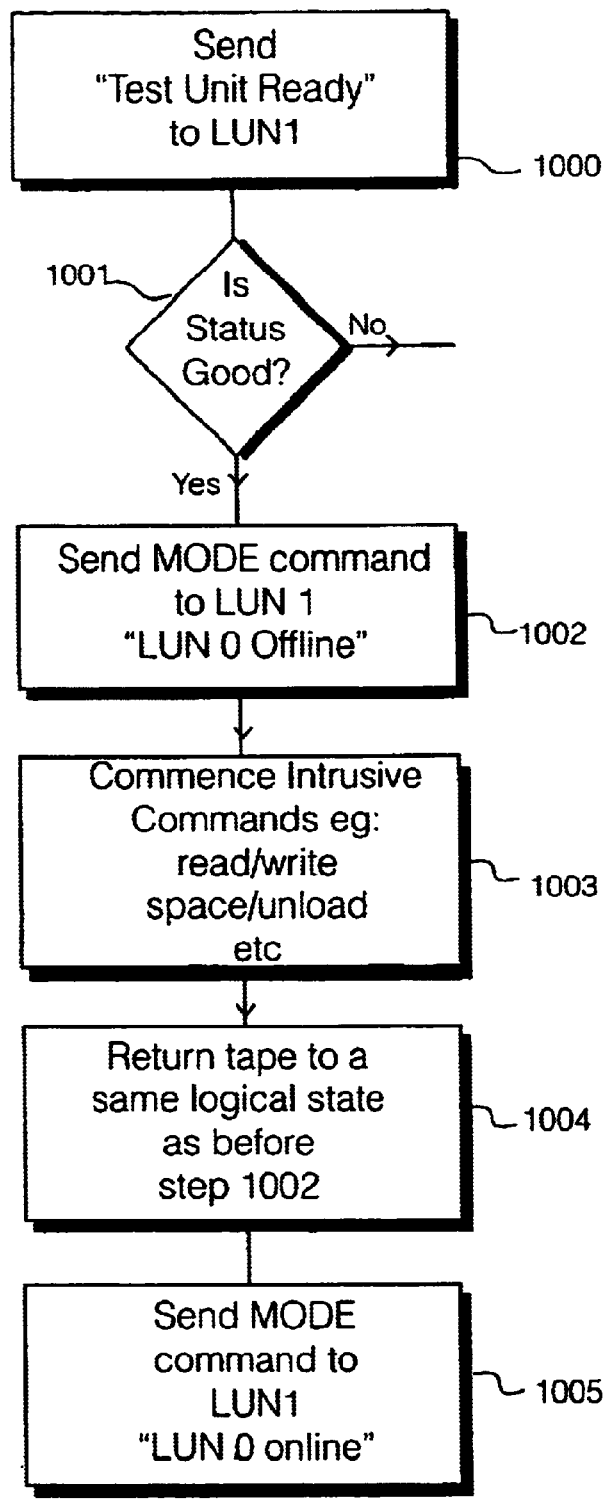
FIG. 10 illustrates schematically, process steps performed during an intrusive interrogation of a sequential access device according to specific methods of the present invention.

Referring to FIG. 10 herein, there are illustrated schematically process steps formed by first and second logical units 0 and 1 during an intrusive diagnostic operation. In step 1000, the computer device 600 sends a SCSI test unit ready signal to the second logical unit 610 of the sequential access device 606, which typically comprises a tape drive data backup device. In step 1001, the second logical unit 1, 610 receives a test unit ready signal from the computer device 600 and determines whether a status of the device is such that diagnostic data can be conveniently produced without interrupting normal operation of the device. If the device is not ready, then the second logical unit 610 returns a signal to the computer device that the sequential access device Is not in a condition ready to send diagnostic data to the computer 600. However, If the sequential access device is in a condition to provide diagnostic data, In step 1002 second logical unit 1 sends a mode command to first logical unit 609 LUN 0, to send that logical unit off-line within the device. In the off-line condition, the first logical unit is set to a condition in which it can be driven by diagnostic driver 604, rather than tape driver 603. Thus, in the off-line condition, first logical unit LUN 0 will not respond to commands from backup application 601 or tape driver 603, but will respond to commands from tape hardware management application 602 and diagnostic driver 604. In step 1003, intrusive commands are received by first logical unit LUN 0 from the diagnostic driver 604. Such commands may include commands such as reading, writing, spacing, or unloading. In step 1004, diagnostic driver 604 sends a command over SCSI 608 to first logical unit LUN 0 returning that logical unit to an initial state in which the first logical unit 0 (609) resided prior to being reset to the off-line condition by second logical unit 610 LUN 1. That is to say, first logical unit LUN 0 is reset to the initial condition it was in prior to step 1002. In step 1005, diagnostic driver 604 sends a mode command to second logical unit LUN 1, for the second logical unit LUN 1 to change the status of the first logical unit LUN 0 to an online condition. On receipt of this signal, the second logical unit LUN 1 sends a line setting signal to first logical unit LUN 0 to set first logical unit LUN 0 to an online condition in which it receives commands over SCSI interface 608 from tape driver 603 and backup application 601.

Hence, rather than diagnostic driver 604 directly interrogating first logical unit LUN 0, thereby running the risk of disrupting operation of the serial access device 606, diagnostic driver initially interrogates second logical unit LUN 1, 610 which checks whether the sequential access device is in a condition in which an operation can be interrupted before setting first logical unit LUN 0 to an off-line mode of operation in which diagnostic driver 604 can read the status and diagnostic information from first logical unit LUN 0. The diagnostic driver than resets the first logical unit 0 to an initial condition in which it resided prior to going to its off-line condition, and then diagnostic driver, via SCSI interface 607, 608 and second logical unit LUN 1 resets the first logical unit LUN 0 609 to an online condition in which control of first logical unit 609 is returned to tape driver 603 and backup application 601 for normal operation of the sequential access device.

Figure 11:
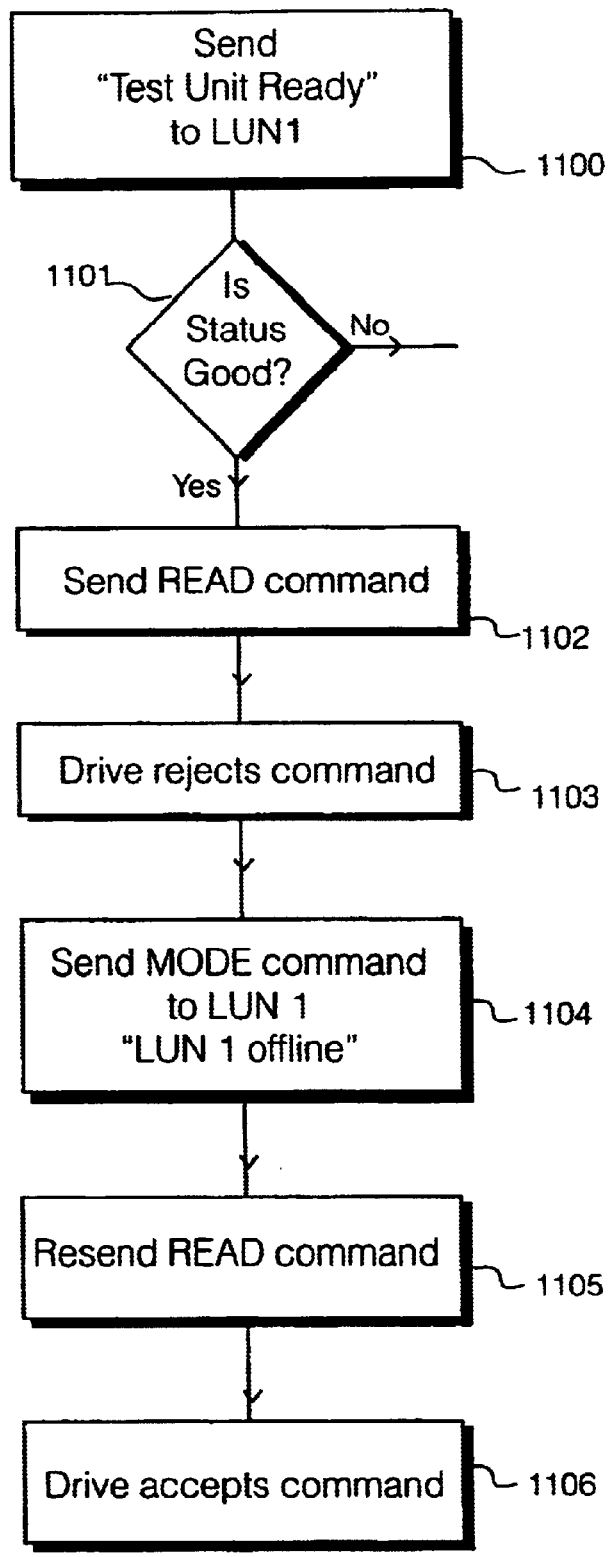
FIG. 11 illustrates schematically process steps performed during a non-intrusive Interrogation of a sequential access device according to specific methods of the present Invention.

Referring to FIG. 11 herein, there is illustrated schematically process steps carried out by the system of the computer device 600 and the sequential access device 606 for performing a read operation of the sequential access device by the computer device 600. In step 1100 diagnostic driver 604 sends a test unit ready signal to second logical unit 610 over SCSI interface 605, 607, 608. In step 1110, second logical unit 610 performs a status check of the sequential access device including first logical unit 609, to determine whether the sequential access device is ready to send diagnostic data, or is busy with a normal operation. If the status of the sequential access device is busy, then second logical unit 610 returns a busy signal to diagnostic unit 604 and diagnostic unit 604 repeats step 1100 after a predetermined time. If the status check carried out by the second logical unit 610 indicates that the status of the sequential access device is not busy, then in step 1102 diagnostic driver 604 sends a read command over the SCSI interface to second logical unit 610. If the sequential access device rejects the read command In step 1103, then in step 1104 diagnostic driver 604 sends a mode command signal to the second logical unit 610, to send the second logical unit into an off-line condition, in which the second logical unit 610 can accept commands directly from the diagnostic driver 604, and is relieved of any new routine control operations which it may perform for the sequential access device. In step 1105, diagnostic driver 604 resends the read command which is now received by the second logical unit 610 which is in the off-line mode. The second logical unit 610 then accepts the read command from the diagnostic driver 604.

What is claimed is:

1. A device configurable for exchanging data with a digital computer across a small computer system interface bus, said device comprising:

a first logical unit configured to respond to interrogation commands and device management commands issued by said digital computer;

a second logical unit;

said second logical unit being configured for receiving a command from said digital computer across the small computer system interface bus, said command being arranged for requesting data concerning a status of said device, said second logical unit being arranged for receiving said command requesting said status data substantially independently of an operation of said first logical unit without causing interruption of said operation of said first logical unit.

2. The device as claimed in claim 1, wherein said device has a normal mode of operation; and said device is arranged so the request for status data does not affect the normal mode of operation of said device.

3. The device as claimed in claim 1, wherein said second logical unit is configured for controlling a mode of operation of said first logical unit for exchanging data with said digital computer.

4. The device as claimed in claim 1, wherein said second logical unit is a diagnostic type device.

5. The device as claimed in claim 1, wherein said first logical unit is configured to be controlled by a back-up program resident in a memory of said digital computer; and said second logical unit is configured to be controlled by a hardware management program located substantially within said memory of said digital computer, said hardware management program being arranged for operation substantially independently of said back-up program.

6. The device as claimed in claim 1, wherein:

said second logical unit is configured to control a mode of operation of said first logical unit for exchange of data with said digital computer;

said second logical unit being arranged for determining whether a status of said device is such that diagnostic data can be produced without interrupting normal operation of the device; and the second logical unit being arranged for sending a command to the first logical unit for enabling the first logical unit to adopt a mode in which it can be driven by a diagnostic driver of said digital computer in response to the first logical unit being in a condition to provide diagnostic data.

7. The device as claimed in claim 1, wherein:

said first logical unit is operable in an online condition in which said first logical unit is capable of receiving commands over said small computer system interface for a normal mode of operation of said device; and said first logical unit is operable in an offline condition in which said first logical unit can communicate diagnostic data over said small computer interface bus.

8. A method of querying status of a device configurable to exchange data with a digital computer across a small computer system interface bus, said device including:

a first logical unit within said device; and a second logical unit with said device;

said method comprising the steps of:

sending a command from said digital computer to said second logical unit across said interface bus, said command requesting status data concerning said device; and at the second logic unit, performing an action in response to said request substantially independently of an operation of said first logical unit.

9. A computing entity comprising:

a digital computer device;

a small computer system interface bus, said digital computer device being connected to a first end of said interface bus; and at least one peripheral device connected to a second end of said interface bus;

said computer entity further comprising:

a first logical unit logically located substantially within said peripheral device; and a second logical unit logically located substantially within said peripheral device, said second logical unit being configurable for controlling a mode of operation of said first logical unit for performing status diagnostic operations of said peripheral devices said first logical unit being operable in an online condition in which said first logical unit is capable of receiving commands over said small computer system interface bus for a normal mode of operation of said device; and said first logical unit being operable in a second condition in which said first logical unit can communicate diagnostic data over said small computer system interface bus.

10. A method of interrogating a serial small computer system interface compatible device including first and second logical units, without affecting a normal mode of operation of said device, said method comprising the steps of:

sending a test signal to said second logical unit of said device;

in response to said test signal, determining a status of said device;

said second logical unit sending a control signal to said first logical unit to send said first logical unit from an initial on-line condition in which said first logical unit receives commands over said small computer system interface for normal mode of operation of said device to an off-line condition in which said first logical unit communicates diagnostic data over said small computer system interface;

receiving a command signal at said first logical unit, said command signal requesting diagnostic data describing parameters of said device;

said first logical unit performing a set of commanded operations in said device for determining said diagnostic data, in response to said received signals;

said first logical unit returning said device to said initial state;

returning said first logical unit to an off-line condition; and said second logical unit releasing control of said first logical unit once said device is returned to said initial state.

11. A method as claimed in claim 10, further comprising the step of said first logical unit sending diagnostic data selected from the set including:

vendor identification data;

device identification data identifying said device;

product identification data identifying a version of said device;

configurable data which is configurable by a user of said device;

device-type code data indicating that said device is a sequential access device type; and device-type code data indicating that said device is a communication device-type.

12. A method of interrogating a serial small computer system interface compatible device without affecting a normal mode of operation of said device, said method comprising the steps of:

sending a test signal to a first logical unit of said device;

receiving a read command at said device for reading data from said device;

if said read command is rejected by said device, sending a mode command signal to said device to change a mode of operation of said device;

in response to said mode command signal changing a status of second logical unit to an off-line status; and re-sending said read command to said device.

* * * * *